Sept. 18, 1928.
H. GASSTROM
1,684,483
JOINT FOR EXTENSION RULES
Filed April 1, 1927
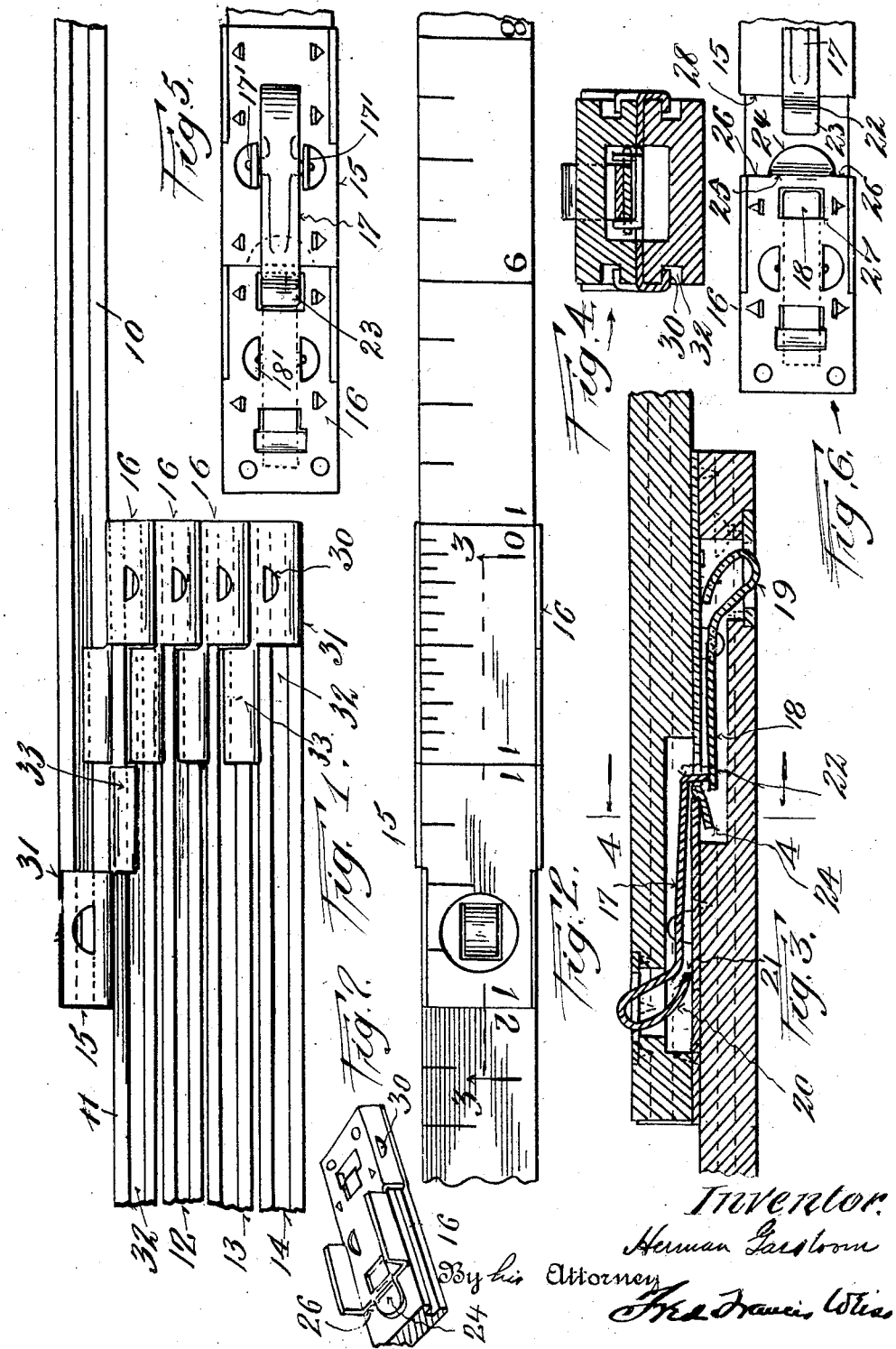
Inventor.
Herman Gasstrom
By his Attorney
Fred Francis Wise Patented Sept. 18, 1928.

1,684,483

UNITED STATES PATENT OFFICE.

HERMAN GASSTROM, OF MOUNT VERNON, NEW YORK.

JOINT FOR EXTENSION RULES.

Application filed April 1, 1927. Serial No. 180,200.

This invention relates to improvements in joints for extension rules of the sliding open and closing type and has for its object the provision of a joint which will automatically operate to lock in fixed relation the adjacent rule lengths in extended position, so that these will assume accurate length positions for rule measurements, at the same time the locking act of one joint will unlock its following rule length. Another object includes a construction which will permit full width abutment of adjacent joint sections to avoid wear or slackness and irregularity of the locking joints with the resulting uncertainties and inaccuracies in measurements.

Other objects will appear hereinafter and I attain these objects by a construction illustrated in the accompanying drawing in which, Fig. 1 is a view in side elevation of a rule partially extended which is provided with my new and improved joints.

Fig. 2 is a top view thereof;

Fig. 3 is a section taken on the line 3—3 of Fig. 2 looking in the direction of the arrows;

Fig. 4 is a sectional view taken on the line 4—4 of Fig. 3;

Fig. 5 is a plan view of adjacent joint sections in locked position with the upper rule length removed to show the relation of the several parts; and Fig. 6 is a view of the same joint sections shown in Fig. 5, but in unlocked positions, and Fig. 7 is a view in perspective showing a joint plate provided with my improvement.

Like numerals refer to similar parts throughout the several views.

In rules of the sliding or extension type, and as shown herein for the purpose of illustration it is of great importance, that the joint sections function properly, that is, that they lock in accurate positions and without play or lost motion due to wear or other causes, whereby the accuracy and reliability of the rule is impaired. It is also of great importance that the joint sections be readily made and easily secured to the rule lengths so as not to make the cost of manufacture prohibitive, and still have an efficient, reliable and most desirable rule.

As a specific application of my invention to extension rules, I have shown, in Fig. 1 a portion of an extension rule which shows a number of rule extensions 10, 11, 12, 13, 14 equipped with interlocking joint sections 15 and 16. It is understood that the successive rule lengths 11, 12, 13 and so on will be unlocked for extensions by the joint section on the preceding rule section. That is, as the rule sections are extended to open position, its joint section (15) will abut and interlock with the next joint section (16) to firmly hold the rule lengths in extended position. For convenience joint section 15 will be called the "active" joint section and joint section 16 the "passive" joint section. At the same time that the active joint section (15) interlocks with the passive joint section (16) the unlocking member 17 of the active joint engages and depresses the interlocking member 18 of the passive joint section, thereby depressing the locking head 19 to release the next or adjacent rule section for extension. Members 17 and 18 are pivotally held in ears 17' and 18'. It will be noted that the unlocking member 17 is tensioned by reason of the spring loop 20, engaging the section plate 21 of joint 15. The member 17 is also provided with a catch end 22 which may be blunt as shown in Fig. 3, or it may be provided with a riding extension 23 as is shown in Figs. 5 and 6. The catch end or the riding extension, as the case may be rides up the inclined tab 24, which has an abutment ridge 25 over which the catch end rides. This ridge is in alignment with the plate edges 26 of the passive joint section (16). As the rule joints assume the locked position (Fig. 5) the catch end, or the riding extension of the interlocking member 17 engages the end of member 18 through the opening 27 in joint section 15, thereby depressing the locking head 19 to unlock the next rule length, and at the same time interlocking the now closed joint sections (15 and 16). In this position, the edge 26 of the passive joint section acts as an abutment for the adjacent edge 28 of the active joint section to thereby afford a firm and unyielding stop and to hold the joint sections, and therefore their rule lengths, in positive and fixed relation when said joints interlock.

It will be noted that the section joints are secured on the end of the rule lengths by tabs 30 cut from the flanges 31 and pressed into the lateral grooves 32 of the rule lengths. The oppositely turned flanges 33 slidably engage the adjacent rule length so that adjacent rule lengths may be opened and closed by sliding back and forth as the joint sections are interlocked and unlocked in the manner stated above.

I claim,—

1. In an extension rule, a plurality of slidably held rule lengths in combination with cooperating joint sections secured on said lengths, said sections having plates, means for interlocking said sections in positive position including abutting edges extending across said section plates for limiting the relative positions of said sections in their locked position.

2. In an extension rule, a plurality of slidably held rule lengths in combination with cooperating joint sections secured on opposite ends of said lengths, tensioned locking members carried by said sections, said sections having plates on which said members are mounted, one of said plates having a sloping tab extending toward the cooperating section, one of said sections having also an abutting edge formed on the tab and extending therefrom against which edge the cooperating section plate abuts when the joints are brought together for opening the rule lengths.

3. In an extension rule, a plurality of slidably held rule lengths having grooves in combination with cooperating joint sections secured on opposite sides of said lengths said sections including pairs of oppositely disposed flanges reversely placed, one pair of said flanges slidably engaging grooves on the ends of the adjacent rule length, the other pair of said flanges fixedly engaging grooves on its own rule length, a ridged sloping member projecting from one of said joint sections and means on said joint sections for positively aligning said sections.

4. Joint sections for interlocking slidable sections of an extension rule, comprising plate members having pairs of oppositely disposed flanges for slidably engaging adjacent rule lengths and interlocking levers pivotally mounted on opposite faces of said plate members for interlocking the companion plate members and unlocking an adjacent rule length, and an inclined projection provided with an abutment on one of said plates against which the other of said plates is secured when the rule lengths are extended in open position.

5. A pair of cooperating joint sections for extension rules, comprising plate members having spring tension levers pivotally mounted thereon for locking the said pair of joint sections and for simultaneously unlocking an adjacent joint section, means for positively holding said pairs of cooperating joint sections in fixed relation and shoulders at the meeting edges of the members extending transversely thereof so as to afford abutments meeting entirely across the same.

6. An extension rule having slidable rule sections, plate members on the ends of said sections, said plate members having oppositely disposed flanges for interengaging the adjacent sections, one of said plate members having an inclined portion with an offset therein in alignment with the edge of said plate to form an abutment.

HERMAN GASSTROM.